(12) United States Patent
Ramsey

(10) Patent No.: US 7,631,362 B2
(45) Date of Patent: Dec. 8, 2009

(54) METHOD AND SYSTEM FOR ADAPTIVE IDENTITY ANALYSIS, BEHAVIORAL COMPARISON, COMPLIANCE, AND APPLICATION PROTECTION USING USAGE INFORMATION

(75) Inventor: Mark Steven Ramsey, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 11/230,399

(22) Filed: Sep. 20, 2005

(65) Prior Publication Data

US 2007/0067853 A1   Mar. 22, 2007

(51) Int. Cl.
*G06F 7/04* (2006.01)
(52) U.S. Cl. .......................................... 726/27; 726/28
(58) Field of Classification Search ..................... 726/3, 726/27, 28, 22
See application file for complete search history.

(56) References Cited

U.S. PATENT DOCUMENTS

| 6,334,121 | B1 | 12/2001 | Primeaux et al. ............... 706/62 |
| 2003/0005326 | A1 | 1/2003 | Flemming .................... 713/201 |
| 2003/0037251 | A1 | 2/2003 | Frieder et al. ................ 713/200 |
| 2003/0112942 | A1 | 6/2003 | Brown et al. ................. 379/196 |
| 2003/0126471 | A1 | 7/2003 | Hillis et al. .................. 713/201 |
| 2004/0059950 | A1 | 3/2004 | Bender et al. ................ 713/202 |
| 2004/0068559 | A1 | 4/2004 | Shaw .......................... 709/224 |
| 2004/0083389 | A1 | 4/2004 | Yoshida ...................... 713/201 |
| 2004/0230530 | A1* | 11/2004 | Searl et al. ..................... 705/51 |
| 2005/0086529 | A1 | 4/2005 | Buchsbaum ................. 713/201 |
| 2005/0203881 | A1* | 9/2005 | Sakamoto et al. ............... 707/3 |

FOREIGN PATENT DOCUMENTS

JP    2002304378 A    10/2002

* cited by examiner

*Primary Examiner*—Matthew B Smithers
*Assistant Examiner*—Ali S Abyaneh
(74) *Attorney, Agent, or Firm*—Yee & Associates, P.C.; John R. Pivnichny

(57) ABSTRACT

A method in a data processing system for managing access to a resource. A user is validated to use the resource based on data provided in an act by the user. A set of user behavioral attributes from acts generated by the user are identified while the user is using the resource. The set of user behavioral attributes are compared to a set of historical user behavioral attributes to form a comparison. Whether to accept a request from the user to access the resource is determined based on the comparison.

20 Claims, 5 Drawing Sheets

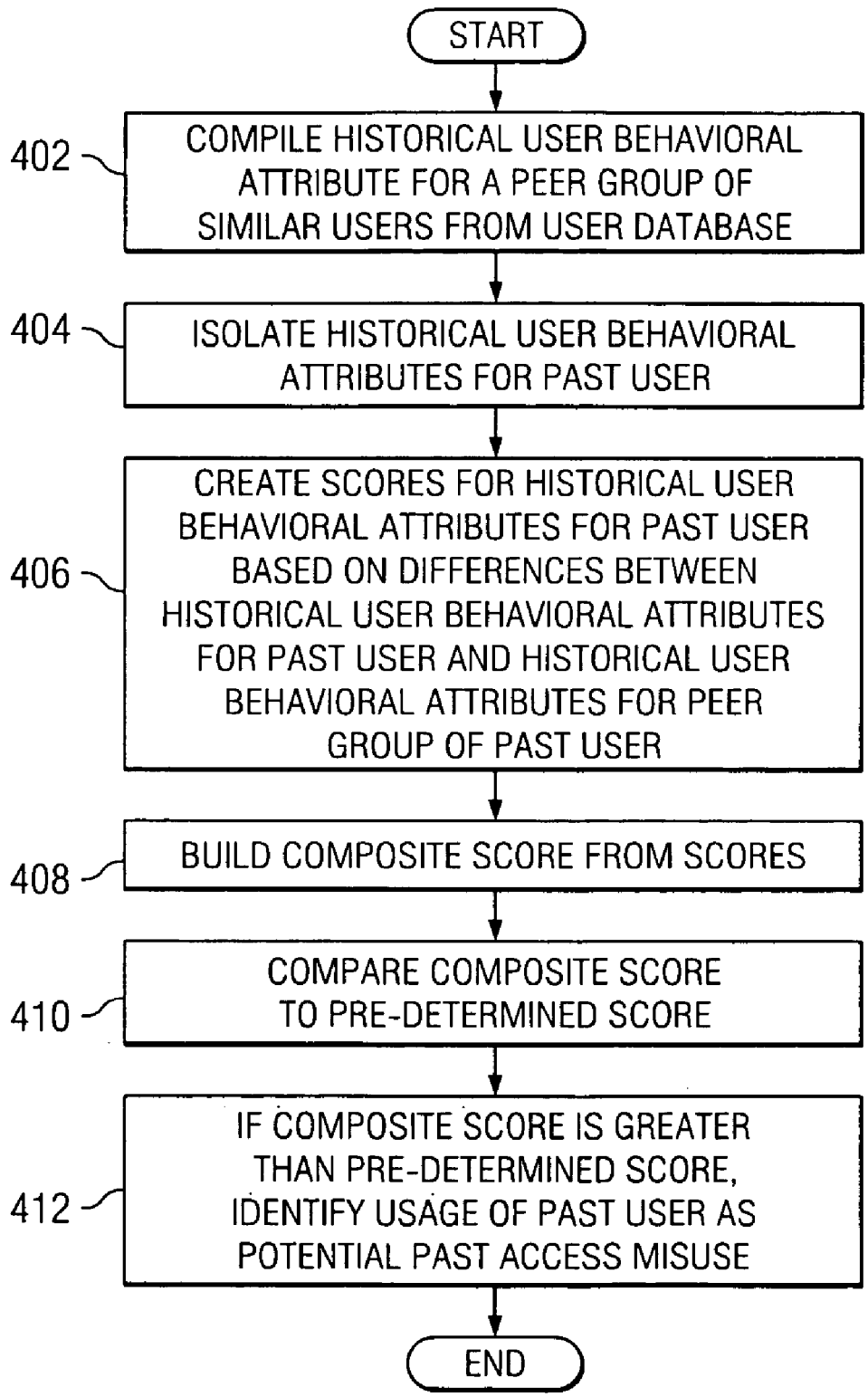

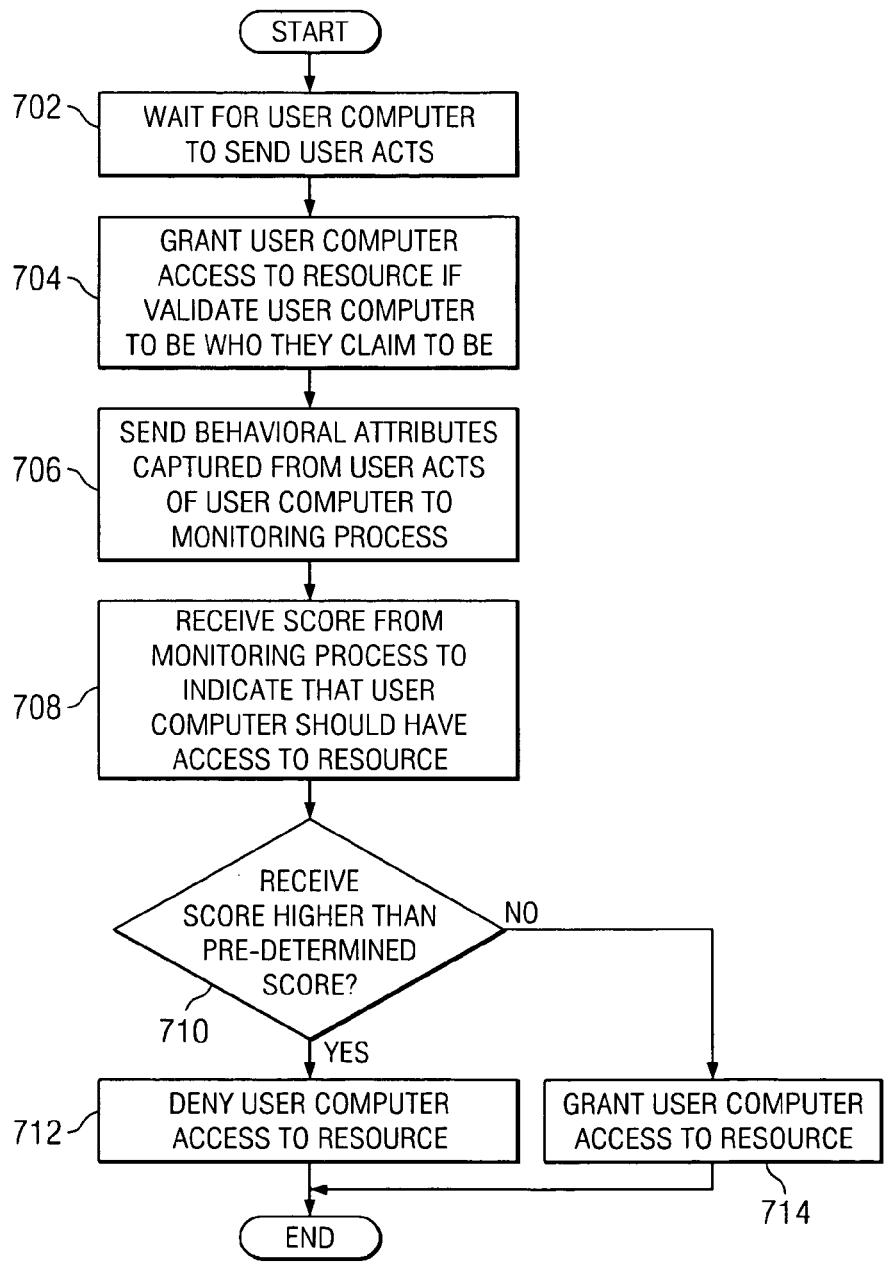

METHOD AND SYSTEM FOR ADAPTIVE IDENTITY ANALYSIS, BEHAVIORAL COMPARISON, COMPLIANCE, AND APPLICATION PROTECTION USING USAGE INFORMATION

BACKGROUND OF THE INVENTION

1. Field of the Invention

The present invention relates generally to an improved data processing system, in particular, to a computer implemented method, data processing system, and computer usable program product for optimizing performance in a data processing system. Still more particularly, the present invention provides a computer implemented method, data processing system, and computer usable program product for adaptive identity analysis, behavioral comparison, compliance, and application protection using usage information.

2. Description of the Related Art

Many organizations are faced with significant challenges to protect sensitive information from being stolen or accessed for inappropriate reasons. As the capture and retention of data increases at an accelerating pace, challenges such as identity theft, data misuse and the sale of sensitive data increases as well.

The current approach used by most organizations to protect sensitive data is by using identity identification. Security software confirms that the user attempting to access a computer application and/or data is validated to be who they claim to be. The validation is done by using user identity numbers/passwords, biometrics (such as a fingerprint scan), or secure cards. This approach validates the identity of the user requesting access. However, the current approach does not validate that the actual use of the data or application is valid.

As reported by the mass media, companies that sell demographic data have had sensitive data stolen by validated users. For example, a user requests and receives validation to obtain data based upon the user's claim to be a private investigator. Once access has been granted, the user accesses the data processing system and requests sensitive data, such as date of birth and social security number. A security method that uses a user identity number/password or a fingerprint scan confirms that the user is the person accessing the application. Once validated, the user is given access to the data processing system, whereby the user may access the data or applications in an invalid manner.

SUMMARY OF THE INVENTION

The aspects of the present invention provide a computer implemented method, data processing system, and computer usable program product for managing access to a resource. A user is validated to use the resource based on data provided in an act by the user. A set of behavioral attributes from acts generated by the user are identified while the user is using the resource. The set of user behavioral attributes are compared to a set of historical user behavioral attributes to form a comparison. Whether to accept a request from the user to access the resource is determine based on the comparison.

BRIEF DESCRIPTION OF THE DRAWINGS

The novel features believed characteristic of the invention are set forth in the appended claims. The invention itself, however, as well as an illustrative mode of use, further objectives and advantages thereof, will best be understood by reference to the following detailed description of an illustrative embodiment when read in conjunction with the accompanying drawings, wherein:

FIG. 4 is a flowchart illustrating a process used for historical analysis, in accordance with an illustrative embodiment of the present invention;

FIG. 7 is a flowchart illustrating a process used for access management in accordance with an illustrative embodiment of the present invention.

DETAILED DESCRIPTION OF THE PREFERRED EMBODIMENT

Figure 1:
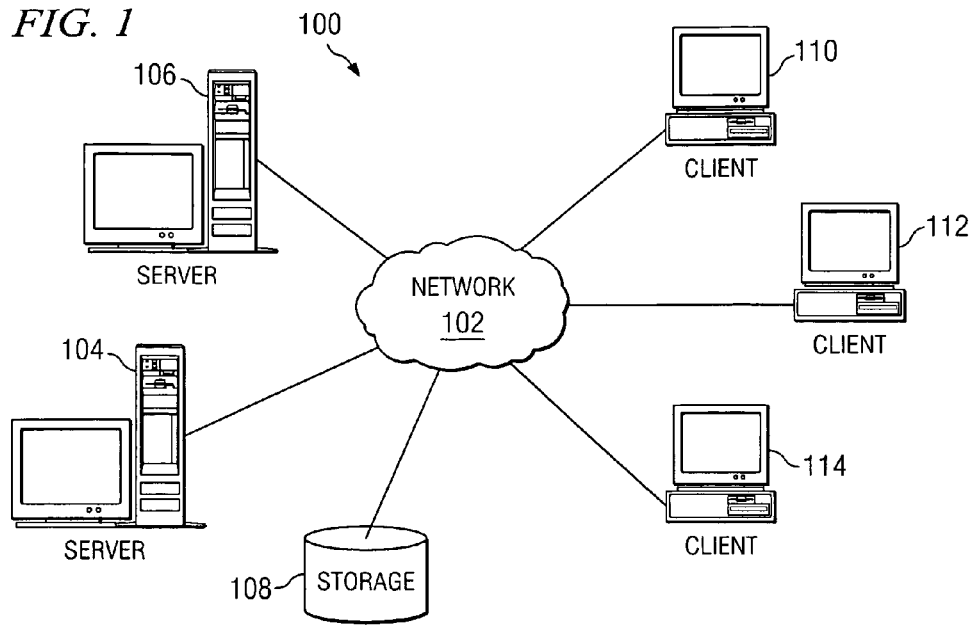
FIG. 1 is a pictorial representation of a network of data processing systems in which aspects of the present invention may be implemented, according to an illustrative embodiment of the present invention.
Figure 2:
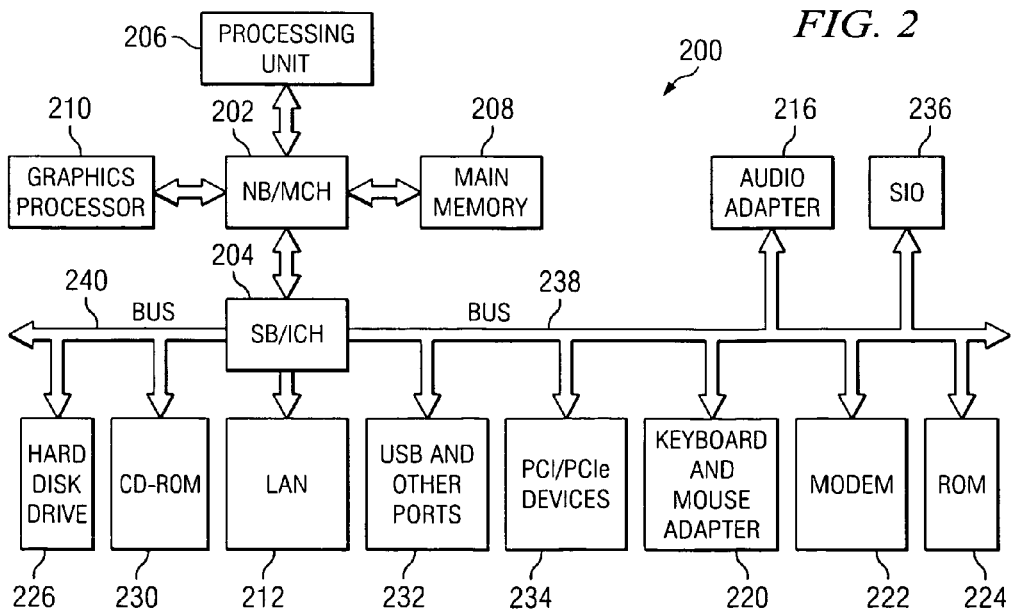
FIG. 2 is a block diagram of a data processing system in which aspects of the present invention may be implemented, according to an illustrative embodiment of the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204.

Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to south bridge and I/O controller hub (SB/ICH) 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to SB/ICH 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

HDD 226 and CD-ROM drive 230 connect to south bridge and I/O controller hub 204 through bus 240. HDD 226 and CD-ROM drive 230 may use, for example, an integrated drive electronics (IDE) or serial advanced technology attachment (SATA) interface. Super I/O (SIO) device 236 maybe connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or the LINUX operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or LAN 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Embodiments of the present invention may be implemented using components of the network for the data processing system in FIG. 1, such as server 104 or storage 106. These embodiments may be implemented to serve the users of a network such as network 102 for the data processing system in FIG. 1, such as client 110, client 112, or client 114.

Embodiments of the present invention provide the ability to develop adaptive profiles for user access and use of secure applications to allow early detection of user misuse or the use of valid access information by another. These different illustrative embodiments provide the ability to monitor the usage of the secure application and/or data and compare that usage to a set of similar users and previous usage to determine behavior that is outside of the normal range of behavior. In these illustrative examples, the set of similar users constitutes a peer group for a user, and the set may contain one or more similar users. The data may be specific files, a database, a spreadsheet, or other information. This unique approach allows the detection of situations such as users with valid data processing system access performing actions that are not acceptable for the type of user.

Figure 3:
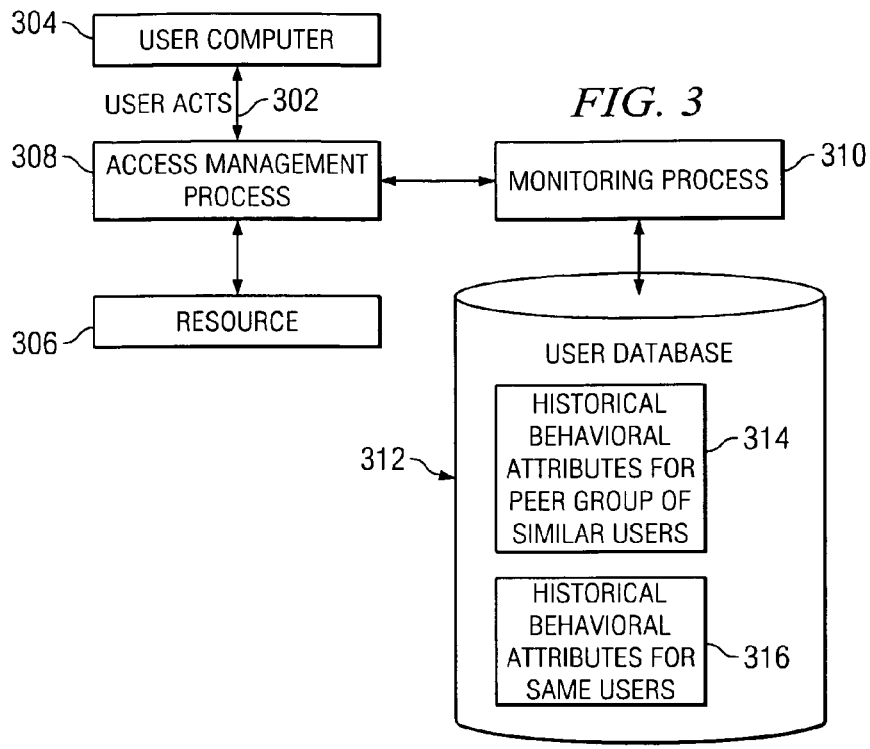
FIG. 3 is a block diagram illustrating components used for managing access to a resource in accordance with an illustrative embodiment of the present invention.

FIG. 3 is a block diagram illustrating components used for managing access to a resource in accordance with an illustrative embodiment of the present invention. Embodiments of the present invention analyze user behavioral attributes captured from user acts 302 during the initial connection of user computer 304 to the resource 306, during the session, and at the conclusion of the session, to determine the validity and compliance of the access. Resource 306 may be, for example, a computer, a database, an application, a set of documents, or some other information.

Behavioral attributes are data captured from any set of user acts, such as user acts 302, including time of logon, day of week for logon, Internet Protocol used for access, frequency of connects, and password attempts before valid, minutes connected, applications used, and data accessed. The set of user acts may contain one or more user acts. Access management process 308 captures behavioral attributes from user acts 302 and transmits the behavioral attributes captured from user acts 302 to monitoring process 310.

In turn, monitoring process 310 stores the behavioral attributes captured from user acts 302 in user database 312. Monitoring process 310 also compares behavioral attributes to historical behavioral attributes for a peer group of similar users 314 and historical behavioral attributes for the same user 316 stored in user database 312 to quickly assess deviations in behavior. Monitoring process 310 conveys the degree of behavior deviation to access management process 308.

The degree of behavior deviation for a behavioral attribute of a user may be the difference between the behavioral attribute of the user and a historical behavioral attribute for a peer group of users similar to the user. Alternatively, the degree of behavior deviation may be the difference between the behavioral attribute of the user and a historical behavioral attribute for the same user. The degree of behavior deviation may be adjusted or normalized by the use of a comparison technique, such as a standard deviation curve.

If the deviation in behavior is sufficiently deviant, access management process 308 denies user computer 304 access to resource 306.

For example, if access management process 308 granted user computer 304 access to the resource 306 based upon a claim to be a private investigator, even the initial connection of the user to resource 306 will be compared to a peer group of private investigators.

For example, when user computer 304 connects to resource 306, monitoring process 310 analyzes the initial user behavioral attributes about that connection to determine whether the behavior of the user is normal behavior. User behavioral attributes such as time of logon, day of week for logon, Internet Protocol used for access, frequency of connects, and password attempts before valid are known at the time of an initial connection phase. Monitoring process 310 compares these user behavioral attributes to historical behavioral attributes for the peer group of similar users 314 and historical behavioral attributes for the same user 316 to determine how different the behavior of the user is from the normal behavior for his peer group and/or his previous usage.

The behavior analysis of a user is divided into two analyses; historic analysis and prospective analysis. Historical analysis may be used to identify the usage of a past user as a potential past access misuse. Historical analysis also results in the establishment of a set of profiles of normal or acceptable behavior for a peer group of similar users. In turn, prospective analysis uses these profiles of normal behavior to catch potential access misuse at the time it occurs. If prospective analysis identifies behavior of a current user as potential access misuse, prospective analysis denies the user access to a requested resource.

FIG. 4 is a flowchart illustrating a process used for historical analysis in accordance with an illustrative embodiment of the present invention. The process illustrated in FIG. 4 may be implemented in a monitoring process, such as monitoring process 310 in FIG. 3. First, after a past user is identified, the monitoring process compiles a set of historical user behavioral attributes for a peer group of similar users from a user database, such as a set of historical user behavioral attributes for a peer group of similar users 314 from user database 312 in FIG. 3 (step 402). The set of the historical user behavioral attributes may contain one or more historical user behavioral attributes.

After that, the monitoring process isolates a set of historical user behavioral attributes for the same user (step 404). These historical user behavioral attributes may be, for example, historical user behavioral attributes for same user 316 in FIG. 3. The set of historical user behavioral attributes for a past user may contain one or more historical user behavioral attributes for the past user.

Next, the monitoring process creates a set of scores for the set of historical user behavioral attributes for the same user based on a set of differences between the set of historical user behavioral attributes for the same user and a set of historical user behavioral attributes for the peer group of similar users (step 406). The set of scores may contain one or more scores, the set of differences may contain one or more differences, and the set of historical user behavioral attributes for the peer group of similar users may contain one or more historical user behavioral attributes for the peer group of similar users. One example of such a score creation is by the use of the standard deviation curve for each historical user behavioral attribute.

A specific example of a historical user behavioral attribute used for historical analysis is the percentage of logons by the private investigator peer group occurring on a Saturday or Sunday. If as a peer group, the logons that occur on a weekend day are very low, embodiments of the present invention create a high score if a user identified as a private investigator logs on to the data processing system on a Saturday.

Then, the monitoring process builds a composite score from the set of scores to determine how much the overall behavior of the past user is different from the overall behavior of the peer group for the past user (step 408). This composite score may be built by combining the set of scores for the past user. For example, weights may be associated with each score and then the weighted scores may be combined. Each of the set of scores and the composite score may be a value in a range, such as between 0-1000, with 1000 being the most suspect score.

The monitoring process compares this composite score to a pre-determined score to identify potential past data misuses that had been previously undetected (step 410).

If this composite score is greater than the pre-determined score, the monitoring process identifies the usage of the past user as a potential past access misuse (step 412). If further investigation proves that an identified potential past access misuse was an actual past access misuse, the appropriate actions may be taken to address that misuse. Historical analysis also results in the establishment of a set of profiles of normal behavior based on the set of historical user behavioral attributes for the peer group of similar users. Users of embodiments of the present invention may utilize the composite scores for incidents of known past access misuse and previously unknown past access misuse to devise the threshold level for the pre-determined scores which determine when an analyzed access usage may be treated as access misuse, either for historical analysis or prospective analysis.

These profiles of normal behavior serve as baselines for current users. These baselines are ones that will be applied during prospective analysis. The more extensive the historical user behavioral attributes that are initially available, the sooner that a more accurate profile of normal behavior may be prospectively applied to the current users based on the peer groups for the current users. The current users and peer groups for each resource may be somewhat unique, such that a resource lacking initial historical user behavioral attributes may simply need to capture current user behavioral attributes over time to create these profiles of normal behavior. While developing profiles of normal behavior, any potential misuses that would avoid detection under a rule-based security system may temporarily go undetected during prospective analysis, but soon sufficiently developed historical user behavioral attributes would enable the monitoring process to detect misuses that occurred during the initial development of profiles of normal behavior by a subsequent application of historical analysis.

Prospective analysis is intended to catch potential access misuse at the time it occurs, rather than after the fact during a historic analysis. When a current user connects to the resource and when the current user attempts to access the resource, an access management process, such as access management process 308 in FIG. 3, passes the current user behavioral attributes that are known to the monitoring process as a message requesting a composite score indicating a likelihood of access misuse. The monitoring process receives the request and compares the current user behavioral attributes to the profile of normal behavior for the peer group for the current user. The monitoring process returns a composite score to the access management process, which takes appropriate action based upon the composite score, such as denying a user computer access to a resource, such as denying user computer 304 access to resource 306 in FIG. 3.

For example, a composite score exceeding 750 may result in the access management process denying an access request. A composite score less than 750 but more than 500 may result in the access management process permitting the current access request, but may make subsequent access denials more likely and the access management process may also send a message to a resource administrator to request further investigation.

It is possible to provide a real-time assessment of the behavioral deviation by leveraging the historic profiles of normal behavior for peers. Embodiments of the present invention combine the peer group information derived from past behaviors to determine the behavioral deviation.

Figure 5:
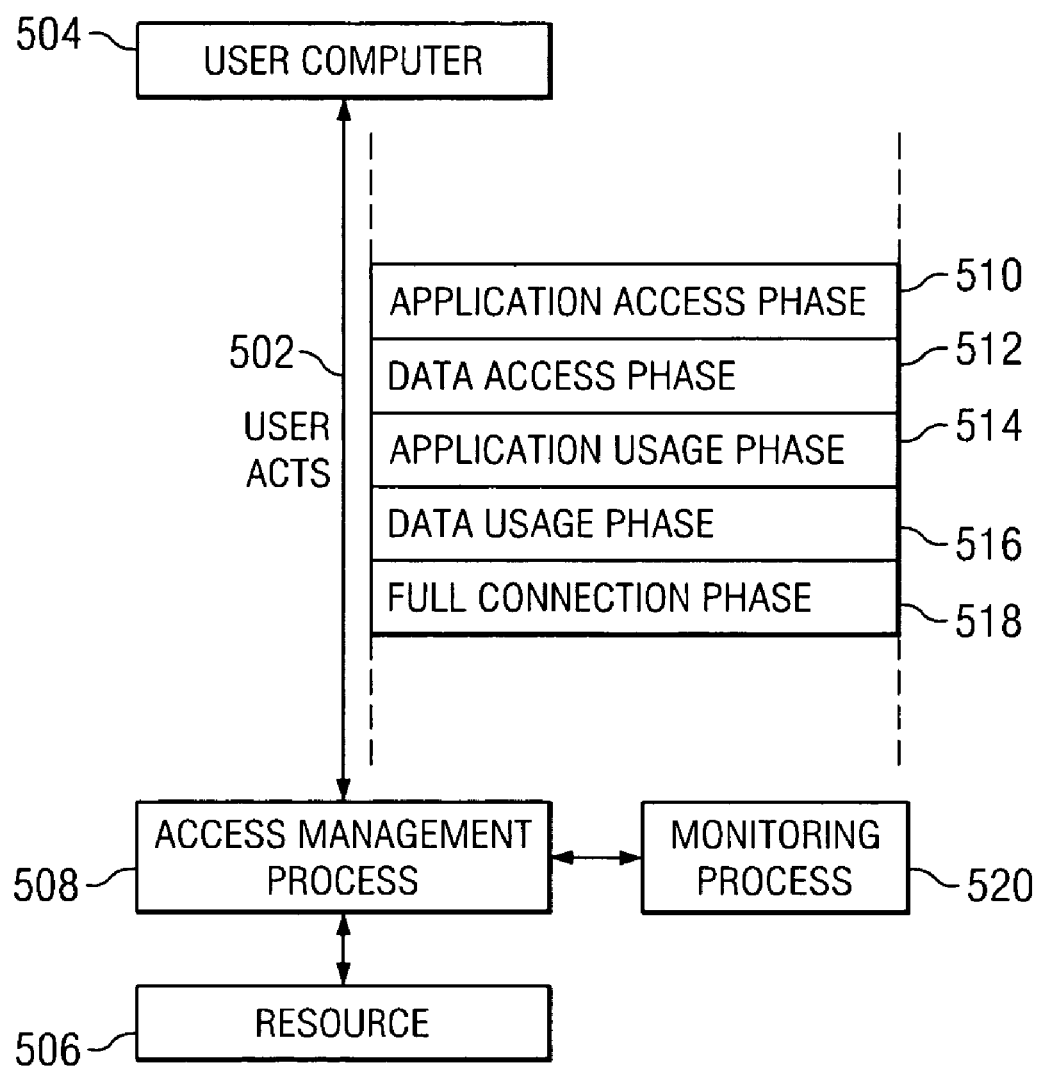
FIG. 5 is a block diagram illustrating some phases occurring during prospective analysis in accordance with an illustrative embodiment of the present invention.

FIG. 5 is a block diagram illustrating some phases occurring during prospective analysis in accordance with an illustrative embodiment of the present invention. If access management process 508 permits a request for access in user act 502 from user computer 504 to access resource 506, subsequent requests for access may then proceed into many phases. Access management process 508 captures behavior attributes from user acts 502 across several phases of the connection, including initial connection, application access, data access, application usage, data usage, and full connection. One phase is application access phase 510, such as use of a human resources application. Another phase is data access phase 512, such as requests for salary, date of birth, gender, etc. Yet another phase is application usage phase 514, such as use of four different applications for a specified amount of time. One more phase is data usage phase 516, such as requesting salary, etc., for thirty-four employees. A further phase is full connection phase 518, such as connected for X number of minutes, requested Y amount of data, charged $Z for usage. Other than the initial connection phase, as previously described, that occurs at the beginning of a user's connection, and the full connection phase, which is determined at the end of a user's connection, phases may occur in any order and may be repeated. At each of these phases, access management process 508 sends a message to monitoring process 510 requesting a composite score of the likelihood of access misuse based upon the current user behavioral attributes captured at that phase. Monitoring process 510 returns a composite score to access management process 508 indicating the likelihood of access misuse.

Figure 6:
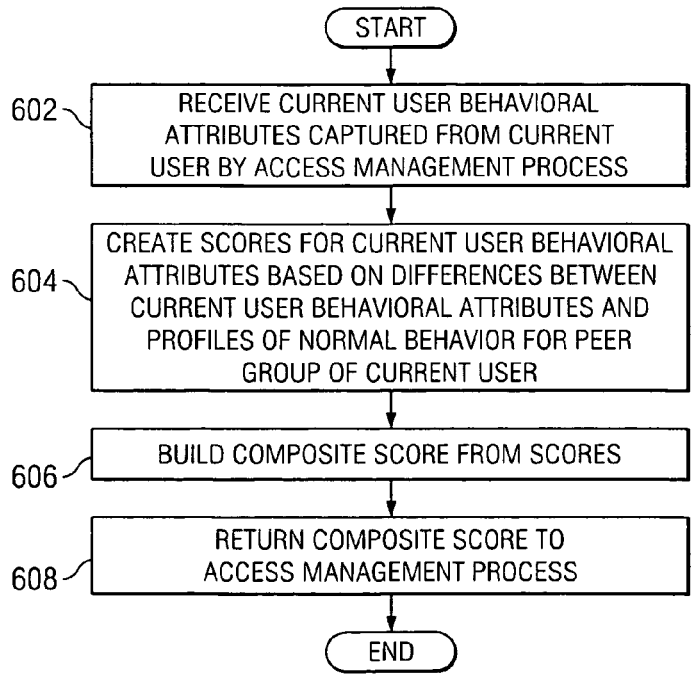
FIG. 6 is a flowchart illustrating a process used for prospective analysis in accordance with an illustrative embodiment of the present invention.

FIG. 6 is a flowchart illustrating a process used for prospective analysis in accordance with an illustrative embodiment of the present invention. The process illustrated in FIG. 6 may be implemented in a monitoring process, such as monitoring process 510 in FIG. 5. First, the access management process sends a set of current user behavioral attributes captured from a current user to the monitoring process (step 602). The set of current user behavioral attributes may contain one or more current user behavioral attributes.

Then, the monitoring process creates a set of scores for the set of current user behavioral attributes based upon a set of differences between the set of current user behavioral attributes and a set of profiles of normal behavior, based on the set of historical user behavioral attributes for the peer group of the current user (step 604). The set of scores may contain one or more scores, the set of differences may contain one or more differences, and the set of profiles of normal behavior may contain one or more profiles of normal behavior.

Next, the monitoring process builds a composite score from the set of scores (step 606). One example of such a score creation is by the use of the standard deviation curve for each set of profiles of normal behavior.

After that, the monitoring process returns the composite score to the access management process indicating the likelihood of access misuse to enable the access management process to take the appropriate action based upon the composite score (step 608).

FIG. 7 is a flowchart illustrating a process used for access management in accordance with an illustrative embodiment of the present invention. The process illustrated in FIG. 7 may be implemented in an access management process, such as access management process 508 in FIG. 5. The access management process waits for the user computer to send user acts, such as user acts 302 in FIG. 3, for example, a request to log on (step 702). The access management process grants the user computer access to the resource if the access management process validates the user computer to be who they claim to be (step 704). The access management process sends behavioral attributes captured from the user acts of the user computer to the monitoring process (step 706). The access management process receives a score from the monitoring process to indicate that the user computer should have access to the resource (step 708). The access management process determines if the received score is higher than a pre-determined score (step 710). If the access management process receives a score higher than the pre-determined score, the access management process denies the user computer access to the resource (step 712). If the access management process receives a score that is not higher than a pre-determined score, the access management process grants the user computer access to the resource (step 714).

This approach allows access misuse to be identified in the following examples, which cannot be detected using normal security approaches:

The access management process confirms a current user who requests access as a private investigator as a valid user. On his first logon, the current user downloads a very large number of sensitive records that the current user plans to sell to others that commit identity theft. Given that this behavior of the current user sufficiently differs from the normal behavior for a peer group of private investigators, the monitoring process detects this difference in behavior.

A current user who requests access as a private investigator is a valid user. The current user leaves his user password on his desk, and another user uses it to logon to the data processing system to steal data. When the behavior of the other user sufficiently differs from the normal behavior for a peer group of private investigators, the monitoring process detects this difference in behavior.

A current user is a call center agent with access to sensitive data to assist customers at the bank where the current user works. When not on a call, the current user scans the data in the data processing system to access the salaries for the neighbors of the current user. Given that this behavior of the current user sufficiently differs from the normal behavior for a peer group of call center agents, the monitoring process detects this difference in behavior.

Overall, embodiments of the present invention solve a business problem that is not addressed using currently available approaches. The processes as shown in FIGS. 4, 6 and 7 provide an improved method for adaptive identity analysis, behavioral comparison, compliance, and application protection using usage information.

The invention can take the form of an entirely hardware embodiment, an entirely software embodiment, or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a tangible computer storage medium include a semiconductor, a solid-state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing access to a resource, the computer implemented method comprising:
   identifying the user as a member of a peer group;
   identifying by a processor a set of user behavioral attributes from acts generated by the user while the user is using the resource;
   comparing by a processor the set of user behavioral attributes to a set of historical peer group behavioral attributes of the peer group to form a comparison;
   scoring by a processor each of the set of user behavioral attributes based on the comparison to form a set of scores, wherein each of the set of scores is a degree of difference of one of the set of user behavioral attributes from one of the set of historical peer group behavioral attributes;
   determining by a processor a composite score from the set of scores to determine an overall degree of difference of the set of user behavioral attributes from the set of historical peer group behavioral attributes;
   responsive to determining that the composite score exceeds a first composite score threshold, requesting by a processor a further investigation of the user and accepting an access request by the user; and
   responsive to determining that the composite score exceeds a second composite score threshold, blocking by a processor the access request from the user.

2. The computer implemented method of claim 1, wherein the set of historical peer group behavioral attributes are user behavioral attributes from a set of acts generated by a set of similar users.

3. A computer implemented method of claim 2, further comprising:
   analyzing by a processor a set of historical user behavioral attributes for a past user; and
   identifying by a processor a usage of the past user as a potential misuse, based upon the analysis.

4. The computer implemented method of claim 3, wherein analyzing the set of historical user behavioral attributes for a past user further comprises:
   creating by a processor a set of scores using a standard deviation curve for the set of historical user behavioral attributes based on a set of differences between the set of historical user behavioral attributes and a set of historical use behavioral attributes for a peer group of the past user;
   building by a processor a composite score from the set of scores; and
   comparing by a processor the composite score to a the first composite score threshold and the second composite score threshold.

5. The computer implemented method of claim 2, wherein the set of similar users comprises only the user.

6. The computer implemented method of claim 1, wherein the resource is at least one of a computer, a database, an application, and a set of documents.

7. The computer implemented method of claim 1, wherein the comparing step further comprises:
   creating by a processor the set of scores using a standard deviation curve for the set of user behavioral attributes based on a set of differences between the set of user behavioral attributes and a set of historical peer group behavior attributes;

building by a processor the composite score from the set of scores; and comparing by a processor the composite score to a pre-determined score.

8. A data processing system for a pattern for adaptive identity analysis, behavioral comparison, compliance, and application protection using usage information, the data processing system comprising:

a bus;

a storage device connected to the bus, wherein the storage device contains computer usable code;

a communications unit connected to the bus; and a processing unit connected to the bus, wherein the processing unit executes the computer usable code to identify the user as a member of a peer group, to identify a set of user behavioral attributes from acts generated by the user while the user is using the resource to compare the set of user behavioral attributes to a set of historical peer group behavioral attributes of the peer group to form a comparison; to score each of the set of user behavioral attributes based on the comparison to form a set of scores, wherein each of the set of scores is a degree of difference of one of the set of user behavioral attributes from one of the set of historical peer group behavioral attributes; to determine a composite score from the set of scores to determine an overall degree of difference of the set of user behavioral attributes from the set of historical peer group behavioral attributes; responsive to determining that the composite score exceeds a first composite score threshold, to request a further investigation of the user and accepting an access request by the user: and responsive to determining that the composite score exceeds a second composite score threshold, to block the access request from the user.

9. The data processing system of claim 8, wherein the set of historical peer group behavioral attributes are user behavioral attributes from a set of acts generated by a set of similar users.

10. The data processing system of claim 9, wherein the processor further executes the computer usable code to analyze a set of historical user behavioral attributes for a past user, and identify a usage of the past user as a potential misuse, based upon the analysis.

11. The data processing system of claim 10, wherein:

in executing the computer usable code to analyze the set of historical user behavioral attributes for a past user, the processor further executes the computer usable code to create a set of scores using a standard deviation curve for the set of historical user behavioral attributes based on a set of differences between the set of historical user behavioral attributes and a set of historical user behavioral attributes for a peer group of the past user, build a composite score from the set of scores, and compare the composite score to the first composite score threshold and the second composite score threshold.

12. The data processing system of claim 9, wherein the set of similar users comprises only the user.

13. The data processing system of claim 8, wherein the resource is at least one of a computer, a database, an application, and a set of documents.

14. The data processing system of claim 8, wherein:

in executing the computer usable code to compare the set of user behavioral attributes to a set of historical user behavioral attributes to form a comparison, the processor further executes the computer usable code to create the set of scores using a standard deviation curve for the set of user behavioral attributes based on the set of differences between the set of user behavioral attributes and the set of historical peer group behavioral attributes, build a composite score from the set of scores, and compare the composite score to a pre-determined score.

15. A tangible computer storage medium having a computer program product encoded thereon, the computer program product being configured for adaptive identity analysis , behavioral comparison, compliance, and application protection using usage information, the computer program product comprising:

computer usable program code configured to identify the user as a member of a peer group;

computer usable program code configured to identify a set of user behavioral attributes from acts generated by the user while the user is using the resource;

computer usable program code configured to compare the set of user behavioral attributes to a set of historical peer group behavioral attributes of the peer group to form a comparison;

computer usable program code configured to score each of the set of user behavioral attributes based on the comparison to form a set of scores, wherein each of the set of scores is a degree of difference of one of the set of user behavioral attributes from one of the set of historical peer group behavioral attributes;

computer usable program code configured to determine a composite score from the set of scores to determine an overall degree of difference of the set of user behavioral attributes from the set of historical peer group behavioral attributes;

computer usable program code configured, responsive to determining that the composite score exceeds a first composite score threshold, to request a further investigation of the user and accepting an access request by the user; and computer usable program code configured, responsive to determining that the composite score exceeds a second composite score threshold, to block the access request from the user.

16. The tangible computer storage medium of claim 15, wherein the set of historical peer group behavioral attributes are user behavioral attributes from a set of acts generated by a set of similar users.

17. The tangible computer storage medium of claim 16, the computer program product further comprising:

computer usable program code configured to analyze a set of historical user behavioral attributes for a past user; and computer usable program code configured to identify a usage of the past user as a potential misuse, based upon the analysis.

18. The tangible computer storage medium of claim 17, wherein the computer usable program code configured to analyze the set of historical user behavioral attributes for a past user further comprises:

computer usable program code configured to create the set of scores using a standard deviation curve for the set of user behavioral attributes based on a set of differences between the set of user behavioral attributes and a set of historical peer group behavior attributes; computer usable program code configured to build a composite score from the set of scores; and computer usable program code configured to compare the composite score to the first composite score threshold and the second composite score threshold.

19. The tangible computer storage medium of claim 15, wherein the resource is at least one of a computer, a database, an application, and a set of documents.

20. The tangible computer storage medium of claim 15, wherein the computer usable program code configured to compare the set of user behavioral attributes to a set of historical user behavioral attributes to form a comparison further comprises:

computer usable program code configured to create the set of scores using a standard deviation curve for the set of user behavioral attributes based on a set of differences between the set of user behavioral attributes and a set of historical peer group behavior attributes;

computer usable program code configured to build a composite score from the set of scores; and computer usable program code configured to compare the composite score to the first composite score threshold and the second composite score threshold.

* * * * *

UNITED STATES PATENT AND TRADEMARK OFFICE
CERTIFICATE OF CORRECTION

PATENT NO. : 7,631,362 B2 Page 1 of 1
APPLICATION NO. : 11/230399
DATED : December 8, 2009
INVENTOR(S) : Mark Steven Ramsey It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1114 days.

Signed and Sealed this

Second Day of November, 2010

David J. Kappos
*Director of the United States Patent and Trademark Office*